US012042908B2

(12) United States Patent
Zhou et al.

(10) Patent No.: US 12,042,908 B2
(45) Date of Patent: Jul. 23, 2024

(54) EXTENSION ROD AND SOCKET

(71) Applicant: YUEQING FENGQIANG TOOL MANUFACTURING CO., LTD., Zhejiang (CN)

(72) Inventors: Qiang Zhou, Zhejiang (CN); Hailong Wang, Zhejiang (CN); Yongqiang Pan, Zhejiang (CN)

(73) Assignee: YUEQING FENGQIANG TOOL MANUFACTURING CO., LTD., Zhejiang (CN)

( * ) Notice: Subject to any disclaimer, the term of this patent is extended or adjusted under 35 U.S.C. 154(b) by 0 days.

(21) Appl. No.: 18/382,176

(22) Filed: Oct. 20, 2023

(65) Prior Publication Data

US 2024/0173827 A1 May 30, 2024

Related U.S. Application Data

(63) Continuation of application No. PCT/CN2023/116134, filed on Aug. 31, 2023.

(30) Foreign Application Priority Data

Nov. 28, 2022 (CN) ........................ 202211499495.X
Nov. 28, 2022 (CN) ........................ 202223169946.8

(51) Int. Cl.
*B25B 23/12* (2006.01)
*B25B 13/06* (2006.01)
*B25B 23/00* (2006.01)

(52) U.S. Cl.
CPC .............. *B25B 23/12* (2013.01); *B25B 13/06* (2013.01); *B25B 23/0035* (2013.01)

(58) Field of Classification Search
CPC ...... B25B 23/0035; B25B 23/12; B25B 13/06
See application file for complete search history.

(56) References Cited

U.S. PATENT DOCUMENTS 2,671,369 A * 3/1954 Clark ...................... B25B 23/12 81/125
2,677,294 A * 5/1954 Clark ...................... B25B 23/12 81/125
2,720,804 A * 10/1955 Brown .................. H01F 7/0257 81/125
2,834,241 A * 5/1958 Chowning .............. B25B 23/12 81/125
3,207,010 A * 9/1965 Wendling ................ B25B 23/12 267/179

(Continued)

FOREIGN PATENT DOCUMENTS

CN 210704597 U 6/2020
CN 211639673 U 10/2020

(Continued)

OTHER PUBLICATIONS

International Search Report cited in PCT/CN2023/116134, mailed Nov. 28, 2023, 5 pages.

*Primary Examiner* — David B. Thomas
(74) *Attorney, Agent, or Firm* — Cooper Legal Group, LLC

(57) ABSTRACT

A extension rod and a socket, belonging to a field of a tool includes an extension rod body, the extension rod body is configured with an accommodation groove, and a magnetic component is slidably arranged in the accommodation groove.

1 Claim, 4 Drawing Sheets

(56) References Cited

U.S. PATENT DOCUMENTS

| | | | | |
|---|---|---|---|---|
| 5,163,345 | A * | 11/1992 | Doan | B25B 13/06 81/125 |
| 5,916,340 | A * | 6/1999 | Forsyth | B25B 23/12 81/125 |
| 6,973,858 | B2 * | 12/2005 | Huang | B25B 23/0035 81/177.85 |
| 7,430,943 | B2 * | 10/2008 | Chiang | B25B 23/0028 81/177.85 |
| 7,581,470 | B1 * | 9/2009 | Huang | B25B 23/0035 279/22 |
| 7,654,175 | B2 * | 2/2010 | Hamon | B25B 13/102 81/125 |
| 8,695,461 | B2 * | 4/2014 | Moss | B25B 13/56 81/125 |
| 9,694,480 | B2 * | 7/2017 | Brown | B25B 23/12 |
| 10,603,769 | B2 * | 3/2020 | Chen | B25B 23/12 |
| 11,167,398 | B2 * | 11/2021 | Chen | B25B 23/0035 |
| 11,318,591 | B2 * | 5/2022 | Minor | B25B 23/0035 |
| 11,325,230 | B2 * | 5/2022 | Chiang | B25B 23/0035 |
| 11,498,191 | B2 * | 11/2022 | Chiang | B25B 23/0035 |
| 2014/0311302 | A1 * | 10/2014 | Taguchi | B25B 23/0035 81/125 |
| 2019/0091840 | A9 * | 3/2019 | Todd | B25B 23/16 |
| 2022/0152795 | A1 * | 5/2022 | Chiang | B25B 23/0035 |
| 2022/0168871 | A1 * | 6/2022 | Minor | B25B 13/065 |
| 2022/0402104 | A1 * | 12/2022 | Chang | B25B 23/12 |
| 2023/0140562 | A1 * | 5/2023 | Santamarina | B25B 23/0035 81/124.4 |

FOREIGN PATENT DOCUMENTS

| | | | |
|---|---|---|---|
| CN | 113276050 | A | 8/2021 |
| CN | 115674067 | A | 2/2023 |
| CN | 219027358 | U | 5/2023 |
| TW | M552858 | U | 12/2017 |
| TW | M627549 | U | 6/2022 |
| TW | 1773283 | B | 8/2022 |

* cited by examiner

EXTENSION ROD AND SOCKET

CROSS-REFERENCE TO RELATED APPLICATIONS

This application is a continuation of PCT application serial no. PCT/CN2023/116134, filed on Aug. 31, 2023, which claims the priority and benefit of Chinese patent applications serial no. 202211499495.8 and 202223169946.X, both filed on Nov. 28, 2022. The entireties of PCT application serial no. PCT/CN2023/116134, Chinese patent application serial no. 202211499495.8, and Chinese patent application serial no. 202223169946.X are hereby incorporated by reference herein and made a part of this specification.

TECHNICAL FIELD

The present application relates to a field of a tool, and, in particular, to an extension rod and a socket.

BACKGROUND ART

A socket is a commonly used tool configured to turn bolts or nuts.

In the existing technology shown in FIG. 1, a combined socket and bolt includes a bolt body 4, an extension rod body 2 and a socket body 1 detachably attached to the extension rod body 2, and a magnet 24 is connected to the extension rod body 2. The bolt body 4 includes a hexagon head 41, a limit stop 42 and a threaded rod 43, and the limit stop 42 is fixed between the hexagon head 41 and the threaded rod 43. The socket body 1 is configured with a hexagonal recess 12 configured to be inserted in by the hexagon head 41, and an end of the magnet 24 is inserted in the hexagonal recess 12 and attacks the hexagon head 41. The socket body 1 can be replaced, so that the socket can be adapted to different bolts and nuts.

But there are at least following questions in the existing technologies. The bolts with the same cross section of hexagon head but with different specifications have hexagon heads with different thickness. When the thickness of the hexagon head is relative small, the hexagon head cannot contact the magnet when being inserted in the hexagonal recess, which influences the attraction between the hexagon head and the magnet, making it different for the bolt to be attracted to the socket, thereby influencing the connection stability between the bolt and the socket. Even if the hexagon head contacts the magnet and the both attracts with each other, the hexagon heads with different thickness would still tend to constitute a gap between the limit stop and the socket body, thereby influencing the connection stability between the bolt and the socket.

SUMMARY

In order to improve the connection stability between bolts of different specifications and sockets, an extension rod and a socket are disclosed.

In the first aspect, an extension rod according to the present application adopts the technical solution as follows.

The extension rod includes an extension rod body, the extension rod body is configured with an accommodation groove, and a magnetic component is slidably arranged in the accommodation groove.

By adopting the above solution, when using the extension rod, a socket body is connected to the extension rod body and the end of the magnetic component is inserted into a hexagonal recess of the socket body, so that the length of the end of the magnetic component inserted in the hexagonal recess of the socket body can be adjusted, since the magnetic component is slidably arranged in the accommodation groove. When turning a bolt, a hexagon head of the bolt is inserted into the hexagonal recess of the socket body, the hexagon head of the bolt and the magnetic component attract with each other. As the hexagon head of the bolt continues to be inserted in the hexagonal recess of the socket body, the hexagon head of the bolt pushes the magnetic component to slide until a limit baffle of the bolt contacts the socket body, at this time the hexagon head of the bolt is completely in the hexagonal recess of the socket body.

Even if the thickness of the hexagon heads of the bolts of different specifications are different, the magnetic component slidably arranged in the accommodation groove can contact and attract the hexagon heads of different thickness by such a configuration, which improves the connection stability between the bolts of different specifications and the socket, thereby improving the adaptability of the socket.

Optionally, an elastic abutment component is arranged in the accommodation groove, and the elastic abutment component is connected to the magnetic component and is configured to drive an end of the magnetic component to move out of the accommodation groove.

By adopting the above technical solution, the elastic abutment component applies a force to the magnetic component, which force drives the end of the magnetic component to move out of the accommodation groove, so that after the socket body is mounted on the extension rod body, the end of the magnetic component can remain in the hexagonal recess of the socket body, and it is not necessary for users to slide the magnetic component again after inserting a hexagon block into the hexagonal recess of the socket body, thereby improving the using convenience of the extension body rod.

Optionally, the magnetic component includes a limit portion and an abutment portion attached to the limit portion, a stopper is provided at a groove wall of the accommodation groove, the stopper is located in a movement path of the limit portion, and the stopper is located on a side of the limit portion departing from a groove bottom of the accommodation groove.

By adopting the above technical solution, when the magnetic component slides in the accommodation groove, the stopper is located in the movement path of the limit portion, and is located on the side of the limit portion departing from the groove bottom of the accommodation groove, which prevents the limit portion from moving out of the accommodation groove while ensuring that the magnetic component can slide, thereby ensuring that the magnetic component is always connected to the extension rod body. The abutment portion can protrude from the accommodation groove and abuts against the hexagon head of the bolt.

Optionally, the magnetic component is configured with a kidney-shaped hole extending in a sliding direction of the magnetic component itself, the extension rod body is provided with a connecting pin, and an end of the connecting pin is inserted in and slidably arranged in the kidney-shaped hole.

By adopting the above solution, when mounting the magnetic component, the magnetic component is mounted in the accommodation groove, and then the connecting pin is connected to the extension rod body, meanwhile the end of the connecting pin is inserted into the kidney-shaped hole, so as to prevent the magnetic component from completely moving out of the accommodation groove, wherein the connecting pin is configured to ensure that the magnetic component is always connected to the extension rod body. The magnetic component can normally slide in the accommodation groove, since the kidney-shaped hole extends in the sliding direction of the magnetic component.

Optionally, the extension rod body is configured with a depression, a connecting component and an elastic connecting element connected to the connecting component are arranged in the depression, the connecting component is slidably arranged in the depression, and when the elastic connecting element is in a natural state, an end of the connecting component protrudes from the depression.

By adopting the above solution, when mounting the socket body onto the extension rod body, the connecting component is pressed into the depression, and at this time the elastic connecting element is compressed. An inner wall of the socket body to be connected must be configured with a groove configured to be inserted in by the end of the connecting component. And then the socket body is sleeved on the extension rod body until the groove in the inner wall of the socket body configured to be inserted in by the end of the connecting component is aligned with the depression, at this time, the end of the connecting component is inserted in the groove in the inner wall of the socket body because of the elastic connecting element, thereby preventing the extension rod body from separating from the socket body.

In the second aspect, a socket according to the present application adopts a technical solution as follows.

A socket includes a socket body and an extension rod, wherein the socket body is connected to the extension rod body, the socket body is configured with a through hole configured to be inserted in by an end of the magnetic component, and the socket body is configured with a hexagonal recess in communication with the through hole.

By adopting the above technical solution, when turning the bolt, the hexagon head of the bolt is firstly inserted into the hexagonal recess, such that the hexagon head contacts the end of the magnetic component and attracts the end of the magnetic component. As the hexagon head of the bolt continues to be inserted into the hexagonal recess, the bolt pushes the magnetic component to slide in the hexagonal recess and the through hole, until a limit stop of the bolt abuts against the socket body.

By this way, even if bolts have hexagon heads with different thickness, the hexagon heads can abut against the magnetic and be completely in the hexagonal recess, which improves the connection stability between bolts of different specifications and the socket, thereby improving the adaptability of the socket.

Optionally, the socket body is sleeved on an end of the extension rod body, an inner wall of the socket body is configured with a connecting groove; and the extension rod body is configured with a depression, a connecting component and an elastic connecting element connected to the connecting component are arranged in the depression, the connecting component is slidably arranged in the depression, and when the elastic connecting element is in a natural state, an end of the connecting component protrudes from the depression and is inserted in the connecting groove.

By adopting the above solution, when connecting the socket body to the extension rod body, the connecting component is completely pressed in the depression, then the socket body is sleeved on the extension rod body until the connecting groove is aligned with the depression, and at this time, the connecting component moves until the end thereof is inserted in the connecting groove to prevent the socket body from separating from the extension rod body, thereby improving the connection convenience of the socket body and the extension rod body.

In summary, at least one of the following beneficial technical effects is realized:

The extension rod is configured with the accommodation groove, and the magnetic component is slidably arranged in the accommodation groove, such that the magnetic component can abut against and attract the hexagon head of the bolt, and move along with the movement of the bolt when the hexagon head of the bolt is inserted into the hexagonal recess of the socket body, so that the hexagon head is completely in the hexagonal recess, thereby improving the connection stability between the bolts of different specifications and the socket.

It can be prevented by means of the elastic abutment component that even if the magnetic component is completely in the accommodation groove, it can't contact the hexagon head of the bolt, such that it is unnecessary for the users to slide the magnetic component to make the magnetic component abut against the hexagon head of the bolt after the hexagon head of the bolt is inserted in the hexagonal recess, thereby improving the using convenience of the socket.

DETAILED DESCRIPTION

The present application is further described in detail below in combination with FIGS. 1-4.

A socket according to embodiments of the present application is disclosed.

Embodiment 1

Figure 1:
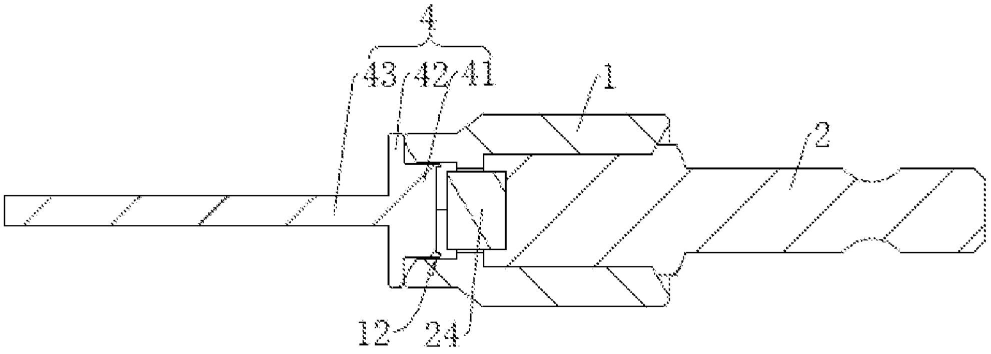
FIG. 1 (PRIOR ART)
FIG. 1 is a section view of an existing technique.
Figure 2:
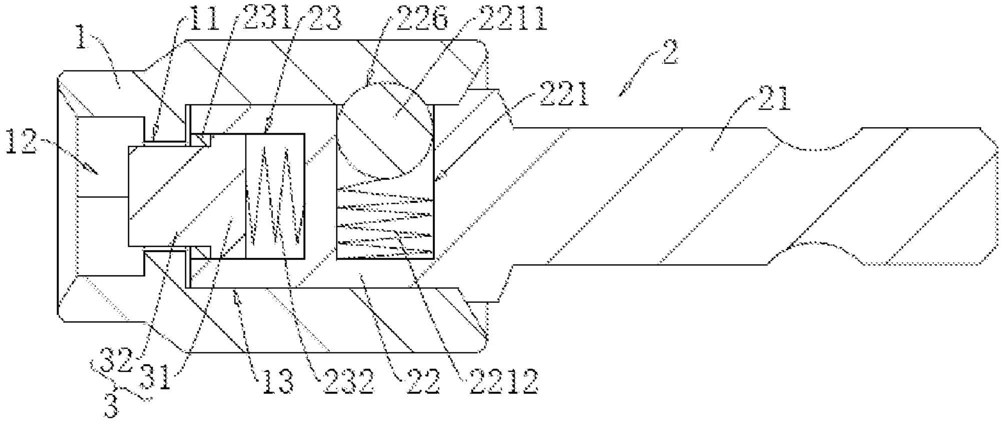
FIG. 2 is a section view of embodiment 1 of the present application.

Referring to FIG. 2, the socket includes a socket body 1 configured to be connected to a bolt, an extension rod body 2 configured to be connected to a wrench and a magnetic component 3 at the extension rod body 2.

Referring to FIG. 2, the extension rod body 2 includes a connecting rod 21 and a mounting rod 22 integrally formed on the connecting rod 21, wherein the connecting rod 21 and the mounting rod 22 are arranged along the axial direction of the extension rod body 2, and the mounting rod 22 is a square rod. An end face of the mounting rod 22 departing from the connecting rod 21 is configured with an accommodation groove 23, the magnetic component 3 is slidably arranged in the accommodation groove 23. The magnetic component 3 is a magnet, and includes a limit portion 31 and an abutment portion 32 integrally formed on a side of the limit portion 31 departing from a groove bottom of the accommodation groove 23, wherein a cross-sectional area of the abutment portion 32 is less than the cross-sectional area of the limit portion 31.

Referring to FIG. 2, a stopper 231 is fixed on a groove wall of the accommodation groove 23, and is ring-shaped. The stopper 231 is located in a movement path of the limit portion 31 and on the side of the limit portion 31 departing from the groove bottom of the accommodation groove 23, and the abutment portion 32 is slidably arranged in an inner hole of the stopper 231. In other embodiments, the stopper 231 can be directly formed on the mounting rod 22 by stamping.

Referring to FIG. 2, an elastic abutment component 232 is arranged in the accommodation groove 23, and is a spring. The elastic abutment component 232 is retractable along the sliding direction of the magnetic component 3, and two ends of the elastic abutment component 232 respectively abuts against the groove bottom of the accommodation groove 23 and the end face of the limit portion departing from the abutment portion 32, such that the limit portion 31 abuts against the stopper 231. In other embodiments, the elastic abutment component 232 can be an elastic sheet and so on, as long as the end of the magnetic component 3 can be driven to protrude from the accommodation groove 23.

Referring to FIG. 2, a side wall of the mounting rod 22 is configured with a depression 221, and an extension direction of the depression 221 is perpendicular to the axial direction of the extension rod body 2. A connecting component 2211 and an elastic connecting element 2212 are arranged in the depression, wherein the connecting component 2211 is a steel ball, and the elastic connecting element 2212 is a spring. The connecting component 2211 is slidably arranged in the depression 221, and two ends of the elastic connecting element 2212 are respectively secured to the depression bottom of the depression 221 and the first end of the connecting component 2211 facing to the depression bottom of the depression 221. The elastic connecting element 2212 is retractable along the sliding direction of the connecting component 2211. When the elastic connecting element 2212 is in a natural state, the second end of the connecting component 2211 protrudes from the depression 221, and a length of the second end thereof protruding from the depression is less than a radius of the connecting component 2211. In other embodiments, the elastic connecting element 2212 can be an elastic sheet and so on, as long as the connecting component 2211 can be reset.

Referring to FIG. 2, the socket body 1 is configured with a through hole 11 through the socket body 1 along the axial direction of the extension rod body 2, the first end face of the socket body 1 is configured with a hexagonal recess 12, the second end face of the socket body 1 departing from an opening of the hexagonal recess 12 is configured with an extension rod groove 13, and the hexagonal recess 12 and the extension rod groove 13 are both in communication with the through hole 11. A groove wall of the extension rod groove 13 is configured with a connecting groove 226, the mounting rod 22 is inserted in the extension rod groove 13, and the second end of the connecting component 2211 is inserted in the connecting groove 226. The abutment portion 32 is slidably arranged in the through hole 11, and the end of the abutment portion 32 is inserted in the hexagonal recess 12 through the through hole 11.

Referring to the FIG. 2, when assembling the extension rod body 2 and the socket body 1, it is only necessary to insert the mounting rod 22 into the extension rod groove 13, and to press the socket body 1 against the connecting component 2211, so as to drive the connecting component 2211 to be retraced in the depression 221, since the connecting component 2211 is steel ball, and the length of the section of the connecting component 2211 that protrudes from the depression 221 is less than the radius of the connecting component 2211 when the elastic connecting element 2212 is in the natural state. The same is true when detaching the extension rod body 2 from the socket body 1, the mounting rod 22 can be directly drawn out from the extension rod groove 13.

The implement principle of above embodiment is as follow. A corresponding socket body 1 is selected according to the side length of cross section of the hexagon head of the bolt to be rotated. When connecting the socket body 1 to the extension rod body 2, the mounting rod 22 is directly inserted into the extension rod groove 13. The connecting component 2211 is first accommodated in the depression 221, and then the second end of the connecting component 2211 is inserted in the connecting groove 226 because of the elastic connecting element 2212, when the depression 221 is aligned with the connecting groove 226. After assembling the socket, the end of the abutment portion 32 is inserted in the hexagonal recess 12 through the through hole 11. When rotating the bolt, the socket body 1 is sleeved on the hexagon head of the bolt through the hexagonal recess 12, the hexagon head abuts against the abutment portion 32, and the hexagon head and the abutment portion 32 attract with each other. As the hexagon head of the bolt further moves into the hexagonal recess 12, the magnetic component 3 is moved until a limit stop of the bolt abuts against the socket body 1, at this time the hexagon head is completely in the hexagonal recess 12. When the rotation of the bolt is completed, the hexagon head of the bolt is draw out from the hexagonal recess 12, and the magnetic component 3 is reset because of the elastic abutment component 232.

By the above structure, the connection stability between the bolts of different specifications and the socket is improved.

Embodiment 2

Figure 3:
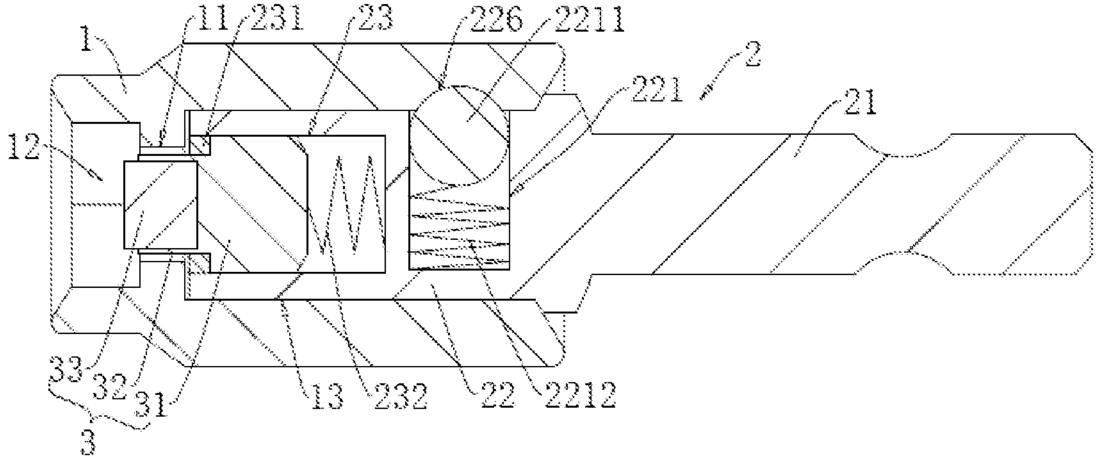
FIG. 3 is a section view of embodiment 2 of the present application.

Referring to FIG. 3, the present embodiment differs from the Embodiment 1 as follows. The magnetic component 3 is slidably arranged in an accommodation groove 23. The magnetic component 3 includes a limit portion 31, an abutment portion 32 and an attraction portion 33, wherein the abutment portion 32 is integrally formed on a side of the limit portion 31 departing from the groove bottom of the accommodation groove 23, the attraction portion 33 is a magnet, and the attraction portion is inlaid in an end of the abutment portion 32 departing from the limit portion 31. A through hole 11 is configured to be inserted in by the end of the abutment portion 32, and the abutment portion 32 is slidably arranged in the through hole 11.

Embodiment 3

Figure 4:
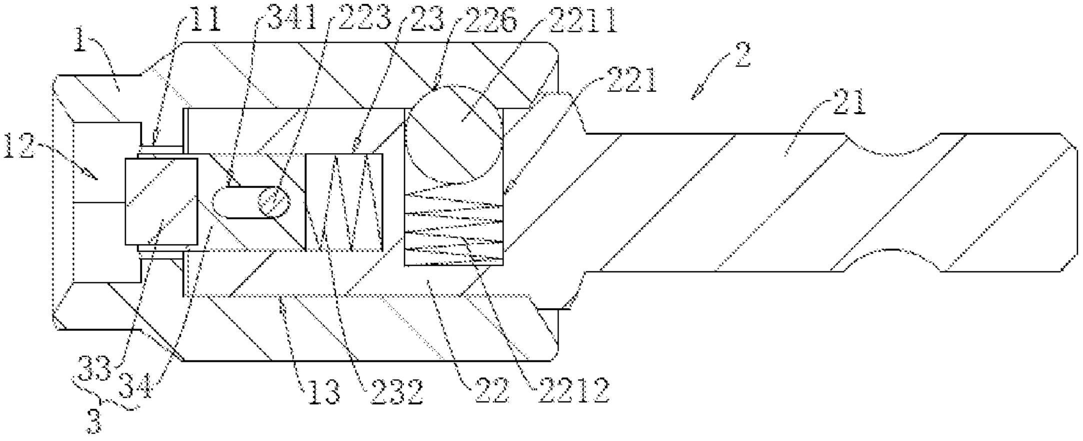
FIG. 4 is a section view of embodiment 3 of the present application.

Referring to FIG. 4, the present embodiment differs from the Embodiment 2 is as follows. The magnetic component 3 includes a slidable portion 34 and an attraction portion 33, wherein the attraction portion 33 is a magnet, and the attraction portion 33 is inlaid in an end of the slidable portion 34 departing from the groove bottom of the accommodation groove 23.

Referring to FIG. 4, the mounting rod 22 is screwed to a connecting pin 223, and an end of the connecting pin 223 is inserted in the accommodation groove 23. The slidable portion 34 is configured with a kidney-shaped hole 341, the kidney-shaped hole 341 extends in a sliding direction of the slidable portion 34, the end of the connecting pin 223 is inserted in and slidably arranged in the kidney-shaped hole 341. Two ends of the elastic abutment component 232 respectively abuts against the groove bottom of the accommodation groove 23 and the end face of the slidable portion

34 facing to the groove bottom of the accommodation groove 23, such that the hole wall of the kidney-shaped hole is pressed against the connecting pin 233.

Referring to FIG. 4, a through hole 11 is configured to be inserted in by the end of the slidable portion 34 and the slidable portion 34 is slidably arranged in the through hole. When mounting the magnetic component 3, the elastic abutment component 232 is mounted in the accommodation groove 23, then the magnetic component 3 is mounted in the accommodation groove 23, and then the connecting pin 233 is screwed to the mounting rod 22, meanwhile, the end of the connecting pin 233 is inserted into the kidney-shaped hole 341.

By such a configuration the magnetic component 3 can be replaced as long as the end of the connecting pin 233 is removed out of the kidney-shaped hole 341, which improves the convenience by assembling and disassembling the magnetic component 3 on the one hand, and the adaptability of the socket is further improved through replacing different lengths of magnetic components 3 on the other hand.

The above are the preferred embodiments of the present application, which are not intended to limit the protection scope of the present application. Therefore, all equivalent changes made according to the structure, shape and principle of the present application should be covered within the protection scope of the present application.

LIST OF REFERENCE SIGNS

1 socket body
11 through hole
12 hexagonal recess
13 extension rod groove
2 extension rod body
21 connecting rod
22 mounting rod
221 depression
2211 connecting component
2212 elastic connecting element
223 connecting pin
226 connecting groove
23 accommodation groove
231 stopper
232 elastic abutment component
24 magnet
3 magnetic component
31 limit portion
32 abutment portion
33 attraction portion
34 slidable portion
341 kidney-shaped hole
4 bolt body
41 hexagon head
42 limit stop
43 threaded rod

What is claimed is:

1. A socket, comprising a socket body and an extension rod, wherein the extension rod comprises an extension rod body, the extension rod body is configured with an accommodation groove, a magnetic component is slidably arranged in the accommodation groove, an elastic abutment component is arranged in the accommodation groove, and the elastic abutment component is connected to the magnetic component and is configured to drive an end of the magnetic component to move out of the accommodation groove, wherein the magnetic component comprises a limit portion and an abutment portion attached to the limit portion, a stopper is provided at a groove wall of the accommodation groove, the stopper is located in a movement path of the limit portion, and the stopper is located on a side of the limit portion departing from a groove bottom of the accommodation groove, wherein the socket body is connected to the extension rod body, the socket body is configured with a through hole configured to receive the end of the magnetic component, the socket body is configured with a hexagonal recess in communication with the through hole, the through hole is configured on a side of an end face of the extension rod body close to the hexagonal recess, a diameter of the through hole is smaller than a maximal diameter of the hexagonal recess, and the abutment portion is slidably arranged in the through hole, wherein the socket body is sleeved on an end of the extension rod body, an inner wall of the socket body is configured with a connecting groove, and wherein the extension rod body is configured with a depression, a connecting component and an elastic connecting element connected to the connecting component are arranged in the depression, the connecting component is slidably arranged in the depression, and when the elastic connecting element is in a natural state, an end of the connecting component protrudes from the depression and is inserted in the connecting groove.

* * * * *